(12) United States Patent
Brombach (10) Patent No.: US 11,196,262 B2
(45) Date of Patent: Dec. 7, 2021

(54) METHOD FOR FEEDING ELECTRICAL POWER INTO AN ELECTRICAL SUPPLY NETWORK

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 244 days.

(21) Appl. No.: 16/463,285

(22) PCT Filed: Nov. 23, 2017

(86) PCT No.: PCT/EP2017/080193
§ 371 (c)(1),
(2) Date: May 22, 2019

(87) PCT Pub. No.: WO2018/096030
PCT Pub. Date: May 31, 2018

(65) Prior Publication Data
US 2019/0312431 A1    Oct. 10, 2019

(30) Foreign Application Priority Data

Nov. 23, 2016   (DE) ..................... 10 2016 122 580.0

(51) Int. Cl.
*H02J 3/28*    (2006.01)
*F03D 9/11*    (2016.01)
(Continued)

(52) U.S. Cl.
CPC .................. *H02J 3/28* (2013.01); *F03D 9/11* (2016.05); *F03D 9/257* (2017.02); *H02J 3/14* (2013.01);
(Continued)

(58) Field of Classification Search
CPC ..... H02J 3/28; H02J 3/14; H02J 3/386; F03D 9/11; F03D 9/257; H02K 7/183; H02P 9/02; F05B 2270/337
(Continued)

(56) References Cited

U.S. PATENT DOCUMENTS 7,528,496 B2   5/2009   Fortmann
8,227,929 B2   7/2012   Burra et al.
(Continued)

FOREIGN PATENT DOCUMENTS

DE   102010014165 A1   10/2011
DE   102011006670 A1   10/2012
(Continued)

*Primary Examiner* — Alfonso Perez Borroto
(74) *Attorney, Agent, or Firm* — Seed IP Law Group LLP (57) ABSTRACT

A method for feeding electrical power into an electrical supply grid by means of at least one wind power installation at a grid connection point, wherein the at least one wind power installation has an aerodynamic rotor with rotor blades and the rotor has a moment of inertia and can be operated with variable rotor speed, the at least one wind power installation has a generator for generating a generator power, multiple energy generators feed power into the electrical supply grid and multiple consumers take power from the electrical supply grid, so that a power balance in the electrical supply grid between the power fed in and the power taken is produced and is positive if more power is fed in than is taken, and the method comprises the steps of: feeding in a basic electrical power in dependence on available wind power, specifying a supporting power to be additionally fed in and additionally feeding in the specified supporting power to be additionally fed in for supporting the electrical supply grid, an amount of supporting energy available for the supporting power to be fed in being determined and the specifying of the supporting power to be
(Continued)

additionally fed in taking place in dependence on the available amount of supporting energy determined.

20 Claims, 4 Drawing Sheets

(51) Int. Cl.
  *F03D 9/25*    (2016.01)
  *H02J 3/38*    (2006.01)
  *H02K 7/18*    (2006.01)
  *H02P 9/02*    (2006.01)
  *H02J 3/14*    (2006.01)

(52) U.S. Cl.
  CPC ............. *H02J 3/386* (2013.01); *H02K 7/183* (2013.01); *H02P 9/02* (2013.01); *F05B 2270/337* (2013.01); *Y02B 70/3225* (2013.01); *Y02E 10/76* (2013.01); *Y04S 20/222* (2013.01)

(58) Field of Classification Search
  USPC .......................................................... 307/18
  See application file for complete search history.

(56) References Cited

U.S. PATENT DOCUMENTS

| | | |
|---|---|---|
| 9,133,825 B2 | 9/2015 | Andresen et al. |
| 9,279,411 B2 | 3/2016 | Beekmann et al. |
| 9,506,454 B2 | 11/2016 | Krueger et al. |
| 9,690,267 B2 | 6/2017 | Haj-Maharsi et al. |
| 9,742,191 B2 | 8/2017 | Beekmann |
| 10,027,266 B2 | 7/2018 | Beekmann et al. |
| 2007/0085343 A1* | 4/2007 | Fortmann ............... H02J 3/381 290/44 |
| 2011/0074151 A1* | 3/2011 | Burra .................... F03D 7/0284 290/44 |
| 2012/0286511 A1* | 11/2012 | Kikuchi ................. F03D 7/028 290/44 |
| 2013/0026759 A1* | 1/2013 | Krueger ................ F03D 7/0272 290/44 |
| 2013/0175871 A1* | 7/2013 | Knuppel ................ H02J 3/381 307/102 |
| 2015/0048683 A1* | 2/2015 | Letas .................. H02M 1/4208 307/52 |
| 2015/0069836 A1* | 3/2015 | Beekmann ............ F03D 7/0284 307/24 |
| 2016/0102653 A1* | 4/2016 | Barton .................... F03D 9/255 290/44 |
| 2018/0291877 A1 | 10/2018 | Engelken et al. |

FOREIGN PATENT DOCUMENTS

| | | |
|---|---|---|
| DE | 102015208554 A1 | 11/2016 |
| EP | 2306001 A2 | 4/2011 |
| EP | 1665494 B1 | 5/2012 |
| RU | 2516381 C2 | 5/2014 |
| WO | 2005/025026 A1 | 3/2005 |
| WO | 2012/041527 A1 | 4/2012 |
| WO | 2012/171532 A2 | 12/2012 |
| WO | 2013/135592 A1 | 9/2013 |

* cited by examiner

METHOD FOR FEEDING ELECTRICAL POWER INTO AN ELECTRICAL SUPPLY NETWORK

BACKGROUND

Technical Field

The present invention relates to a method for feeding electrical power into an electrical supply grid. The present invention also relates to a wind power installation for feeding electrical power into an electrical supply grid. The present invention also relates to a wind farm, comprising multiple wind power installations, for feeding electrical power into an electrical supply grid.

Description of the Related Art

The feeding of electrical power into an electrical supply grid by means of wind power installations or wind farms is known. It is also known in the meantime to offer with wind power installations or wind farms so-called system services, which help to support and/or improve the electrical supply grid.

It is particularly problematic if, to support the electrical supply grid, the power to be fed in is to be increased, because wind power installations usually feed in as much power as they can take from the wind at the time. In this respect, it has been proposed to make an improvement just for achieving short-term increases in power by using power from the flywheel mass of the rotating rotor. If, however, increased power is fed in and power from the rotating rotor is used for this, it slows down, so that the power fed in that is correspondingly increased can only be fed in for a short period of time.

Consequently, although these proposed solutions provide a short-term increase in power, the effects of such a short-term increase in power on the respective wind power installation are tolerated or are not taken into consideration, or only little.

By taking power from the flywheel mass, the rotational speed of the wind power installation is reduced. This not only has effects on the wind power installation concerned, it may also put the electrical supply grid concerned in a degraded state. For example, if too much flywheel energy is taken, the wind power installation may lose its operating point and then possibly first has to continue being operated at an operating point that allows less power to be fed in than would be possible on the basis of the wind prevailing.

What is more, the retrieval of such supporting energy also has the effect that at first no further supporting energy can be taken if the wind power installation concerned or the wind power installations involved altogether have provided their potential for supporting energy. Then the rotational speed of the wind power installations concerned first has to be increased again, in a process which possibly takes quite a long time, to then have flywheel energy available again.

The German Patent and Trademark Office has searched the following prior art in the priority application relating to the present application: DE 10 2011 006 670 A1, DE 10 2015 208 554 A1, WO 2012/171 532 A2 and EP 1 665 494 B 1.

BRIEF SUMMARY

Provided is a solution in which, for a short-term increase in power, one or more wind power installations can provide corresponding supporting power without however at the same time losing a stable working point. It is possible to avoid such provision of supporting power causing one or more wind power installations to become unstable or even to stop.

Provided is a method that concerns the feeding of electrical power into an electrical supply grid by means of at least one wind power installation at a grid connection point. The wind power installation therefore feeds into the electrical supply grid at the grid connection point. The method may also concern multiple wind power installations, to be specific in particular multiple wind power installations that are organized in a wind farm and feed into the electrical supply grid together at the grid connection point.

The at least one wind power installation has an aerodynamic rotor with rotor blades and the rotor has a moment of inertia and can be operated with variable rotor speed. Therefore, a so-called variable-speed wind power installation is taken as a basis. The at least one wind power installation also has a generator for generating a generator power.

It is also taken as a basis that multiple energy generators feed power into the electrical supply grid. Therefore, not just the at least one wind power installation feeds power into the electrical supply grid, but at least one further energy generator, in particular multiple or many energy generators. It is also taken as a basis that multiple consumers take power from the electrical supply grid. This produces a power balance in the electrical supply grid between the power fed in and the power taken. This balance is regarded as positive if more power is fed in than is taken. Ideally, such a power balance is 0, that is when precisely as much power is fed in as is taken.

It is thus proposed for the method that a basic electrical power is fed into the electrical supply grid by the at least one wind power installation in dependence on the wind power available. This basic electrical power is consequently the basis for the power that the wind power installation takes directly from the wind and feeds into the electrical supply grid. This observation disregards power losses that are caused for example by line losses and/or heat losses in transmitting or converting elements of the wind power installation. For purposes of explanation, it is therefore assumed that the power taken from the wind is also fed into the electrical supply grid as this basic electrical power.

Furthermore, a supporting power to be additionally fed in is specified. This supporting power to be fed in consequently goes beyond the basic electrical power and therefore goes beyond the power that can at the moment be taken from the wind by the wind power installation concerned.

This specified supporting power is then additionally fed in, to be specific in addition to the basic electrical power, in order to support the electrical supply grid.

It is thus proposed in this respect that an available amount of supporting energy is determined for the supporting energy to be fed in. The supporting power that is specified and additionally fed in requires an energy source in addition to the wind. This may be for example rotational energy of the aerodynamic rotor. Other or additional energy sources may also be present and used, such as for example a battery store. It is thus proposed to determine such an available amount of supporting energy for the supporting energy to be fed in. In other words, the amount of energy present in the energy sources that is available for the supporting power is determined. The available amount of supporting energy, and not a momentarily available supporting power, is deliberately determined here, in order in this way to make possible a consideration that goes beyond the momentary point in time.

Finally, the supporting power is specified in dependence on the available amount of supporting energy determined. The supporting power therefore does not just depend on the demand for supporting power of the electrical supply grid at the moment and also not just on technical boundary conditions for feeding in this additional supporting power, such as for example current limits, but rather the available amount of supporting energy is also deliberately taken into consideration.

Consequently, it can particularly also be planned over which time period a supporting power of what magnitude can be fed in, in addition to the basic electrical power. In other words, a full consideration of the energy reserve in the additional energy sources is proposed. This proposal also makes it possible to avoid the situation where the available amount of supporting energy is suddenly used up, the corresponding energy sources are therefore depleted, and then the supporting power must abruptly drop. It also creates the possibility of making an appraisal between a momentary supporting demand and a supporting demand still required a short time later. The possibility of planning a progression over time for the supporting power to be fed in is also created. In this case, such planning concerns time periods in the range of seconds, in particular in the range of 5 to 30 seconds.

Preferably, at least one inverter is used for the feeding in of the electrical power. This is also proposed quite generally for any embodiments. Preferably, the supporting power to be additionally fed in is determined depending on a capacity utilization of the at least one inverter. In principle, the supporting power to be fed in is particularly determined in dependence on a power balance, in particular depending on the frequency of the electrical supply grid, which can be a good indicator of the power balance. For this purpose, it is additionally proposed to take into consideration a capacity utilization of the at least one inverter. This particularly means that the feasibility of the additional feeding in of the supporting power is taken into consideration here. Also or alternatively, the reactive power fed in may be taken into consideration, and the supporting power to be additionally fed in correspondingly determined according thereto. The reactive power fed in also contributes to the capacity utilization of the at least one inverter, and it has been recognized that it may therefore be advantageous to take the reactive power fed in into consideration when determining the additional supporting power.

It is preferably proposed to reduce the reactive power fed in, in order to be able to feed in a greater supporting power. Such a reactive power reduction may then already be taken into consideration in the determination of the supporting power to be additionally fed in. In other words, the supporting power to be additionally fed in can then possibly be determined with a greater value than it would be on the basis of the reactive power fed in at the time if the reactive power fed in is reduced to a new value. In this case, this new value of the reactive power fed in is taken into consideration for determining the supporting power to be fed in.

Preferably, the available amount of supporting energy is determined from the moment of inertia of the rotor, at least one operating parameter of the operating point at the time of the wind power installation and an admissible lower rotor speed. The case that the rotational energy stored in the rotor of the wind power installation is the energy source for the available amount of supporting energy is particularly assumed for this. If additional energy sources are present, they may be additionally taken into consideration.

In this determination of the available amount of supporting energy from the rotational energy of the rotor that is proposed here, consequently first the moment of inertia of the rotor is taken into consideration. The moment of inertia of the rotor of the generator may also be added here, but often has a significantly smaller value than the moment of inertia of the aerodynamic rotor.

Also taken into consideration is at least one operating parameter of the operating point at the time of the wind power installation, which is in particular the rotor speed at the time. However, other variables may also be taken into consideration or added here, such as an angle of attack at the time of the rotor blades of the rotor and the electrical generator power delivered at the moment. The moment of inertia of the rotor and the rotor speed can be used to calculate kinetic energy stored in the rotational movement at the time of the rotor.

This kinetic energy of the rotating rotor, that is to say the rotational energy, is however not necessarily the available amount of supporting energy for the supporting power to be fed in, since this rotational energy often cannot be retrieved completely, or it is often inadvisable to retrieve it completely. Retrieving it completely would mean reducing the rotor to 0. That would however be disadvantageous from many aspects, specifically because after that the wind power installation cannot at first feed in any power at all, which adversely affects the overall situation. Furthermore, with a reduction of the rotor speed to very small values or even to 0, the power that can be taken from the wind will also be reduced, so that the power fed in altogether may be reduced, and consequently in fact less additional supporting power is fed in.

It is therefore proposed to take an admissible lower rotor speed additionally into consideration. Such an admissible lower rotor speed is a speed to which the rotor may be decelerated for this support. This admissible lower rotor speed consequently takes into consideration in particular that, at it, further operation of the wind power installation is still possible. In addition, it may take into consideration a reduction of the power taken from the wind, and consequently be set to a value at which the power that can be taken from the wind is only reduced by a predetermined value, which is preferably chosen to be as small as possible.

According to one embodiment, it is proposed that the at least one operating variable of the operating point at the time comprises at least one of the following variables, to be specific the rotor speed at the time, the generator power at the time and the prevailing wind speed.

The rotor speed at the time is particularly used for determining the kinetic energy present, to be specific the rotational energy, of the rotating rotor.

The generator power at the time, particularly together with the rotor speed, is an important operating parameter of the operating point at the time of the wind power installation. It can be used to ascertain whether the wind power installation at the particular time is converting a lot of power or little power, and it can also be deduced from that how much reserve the wind power installation has to shift its operating point. The retrieval of rotational energy has the effect that the operating point of the wind power installation shifts and, depending on where this operating point is located, a correspondingly great or small shift of the operating point is possible. Particularly if the wind power installation converts a lot of power, the prevailing wind speed is also usually high. If the operating point is then shifted from its optimum position into a less optimum position, it can then however be brought back to the previous operating point again more easily when there is particularly strong wind, that is to say a high prevailing wind speed.

On the other hand, a comparatively high power with respect to the rotational speed at the time may indicate that the installation is not operating at an optimum operating point. This may also mean that the operating point on a speed/power characteristic curve lies on one flank and therefore a change of the rotational speed may lead to a comparatively great power reduction. In this case, the taking of rotational energy would lead to a comparatively severe drop in power. This may also mean that the rotational speed can only be lowered a little. As a result of the consideration of the generator power, it can be taken into consideration in the determination of the supporting energy available.

Also or instead, the prevailing wind speed may be taken into consideration. For this purpose, it may be measured, a measurement by a corresponding measuring instrument on the wind power installation or else a measurement by a nearby measuring mast being conceivable. Since the measurement of a wind speed is often inaccurate, it is also conceivable to derive the wind speed from the rotor speed and the generator power.

In any event, it can then be ascertained better from it to what extent the operating point can be changed, and in particular how much the rotor speed can be reduced and consequently how much rotational energy can actually be taken. It is indeed this rotational energy that can be taken that then leads to the available amount of supporting energy. If no further energy sources are present and losses are disregarded, this rotational energy that can be taken is the available amount of supporting energy.

According to a further embodiment, it is proposed that, for determining the available amount of supporting energy, a power loss due to a reduction of the rotor speed is taken into consideration. If, for taking the power, the rotor speed is reduced, the taking of the power from the wind may also be adversely affected by the rotor thus slowed down. That restricts the amount of supporting energy that is in fact available, and consequently can be taken into consideration in the determination of the available amount of supporting energy.

Alternatively or additionally, it is proposed that the specification of the supporting power to be additionally fed in is performed in dependence on the power loss due to a reduction of the rotor speed. As a result, the power loss can be compensated by corresponding adaptation of the supporting power.

According to one configuration, it is provided that the at least one wind power installation for providing the supporting power is coupled to at least one electrical store and, for determining the available amount of supporting energy, a rotational energy of the rotor and in each case a storage content of the at least one electrical store are taken into consideration. The supporting power may in this case rely on multiple energy sources, to be specific on part of the rotational energy of the rotating rotor and on at least one electrical store. Particularly, such an electrical store may be provided in order to increase a possible amount of supporting energy, to be specific to increase it beyond the amount that can be used from the rotating rotor.

The electrical store may be a battery and also or additionally be a high-capacity capacitor, which is also referred to by those skilled in the art as a supercap or ultracap. Particularly the use of such high-capacity capacitors is proposed because they are low in maintenance and can provide energy or power very quickly. Nevertheless, it is also important here what storage content they have, that is to say to what extent they are charged. It also applies to such electrical stores, to the battery and also to the high-power capacitor, that it may be conceivable that they also cannot be discharged completely. This is the case with a capacitor particularly because of the falling voltage and with the battery because of an increasing internal resistance during a discharge. Consequently, it is also proposed here to take into consideration how much the energy present can actually be taken. That may also depend on the electronic switching unit that respectively takes the energy from the electrical store. For example, it may be the case that a capacitor charged to a voltage of 800 volts can for example only be discharged to 300 volts, because such a low voltage of 300 volts or less would require an electronic unit that correspondingly steps up this voltage for use in the wind power installation. This is only mentioned as an example and the stated voltage values are also only given by way of example. Similar problems may occur with a battery. With a battery there is also the problem that it may be destroyed by excessive discharge.

All of these effects are preferably taken into consideration in the determination of the available amount of supporting energy.

According to one embodiment, it is proposed that, when feeding in a supporting power, the available amount of supporting energy is updated, in particular is continuously updated. This updating is therefore intended to take place during the feeding in of the supporting power and must correspondingly be updated quickly and at the same time as the feeding in. It is in this case proposed that this updating is performed in dependence on the supporting energy fed in. Consequently, the supporting energy fed in is monitored and this information is used for constantly updating the available amount of supporting energy. In addition to this, it is particularly conceivable that the supporting energy fed in is continuously integrated over time to give a supporting energy fed in. It should be particularly noted here that, if the available amount of supporting energy allows, a supporting power is fed in in dependence on a frequency in the electrical supply grid. Fluctuations of the frequency may consequently also lead to fluctuations of the supporting power. It is also proposed to take into consideration that there may be a difference between the intended supporting power, that is to say a supporting power setpoint value, and the supporting power actually fed in, that is to say a supporting power actual value. Nevertheless, along with a measurement of the supporting power fed in, it is also conceivable for the supporting power fed in to be taken into consideration on the basis of its setpoint value and to take into consideration particularly dynamic deviations between the intended power and the actual power that are possibly known.

Also or alternatively, it is proposed that the available amount of supporting energy is updated while taking into consideration a behavior of change of the wind power installation as a reaction to the feeding in of the supporting power. It is particularly conceivable here to take into consideration a decrease in the rotor speed as a reaction to delivering rotational energy of the rotor.

Particularly the rotor speed can often be detected very accurately and quickly. Since the moment of inertia of the rotor does not change appreciably, the rotational energy present in the rotor at the time can consequently also be detected. Particularly on the assumption that an admissible lower rotor speed for the supporting case at the time does not change, the change in the available amount of supporting energy can be detected quickly and accurately by observing the decrease in the rotor speed.

The taking of the energy present in one or more electrical stores that are present can often be detected by monitoring the output voltage of these electrical stores. Particularly for battery stores, however, other methods that are in principle familiar to a person skilled in the art are conceivable.

By updating the available amount of supporting energy, the supporting power to be additionally fed in that is specified at the time can be determined in a particularly easy way.

According to one embodiment, it is proposed that the at least one wind power installation is coupled to at least one consumer that can be controllably reduced in its consumption and the determination of the available amount of supporting energy takes into consideration an amount of energy that is available due to a reduction of the at least one controllably reducible consumer. This is particularly based on the idea that a consumer that is coupled to the wind power installation consumes power of the wind power installation. The wind power installation consequently feeds this power less into the electrical supply grid. If this consumer can be reduced or switched off, at least for a short time and also at short notice, this power that is consumed by it, which is normally missing during the feeding in, can then be used for support. This is preferably also taken into consideration during the determination of the available amount of supporting energy.

It is pointed out that such power that the consumer does not consume during the supporting case could be added directly to the supporting power. This is also proposed according to one embodiment, but, while taking into consideration the fact that part, in particular a large part, of the supporting power is taken from the rotational energy of the rotor, the overall situation must be borne in mind and for this it is proposed that this power made available by the consumer reduced in its consumption is also to be converted into available energy and added to the available amount of supporting energy, or the available amount of supporting energy is to be determined while taking into consideration this energy made available by the consumer. For this purpose, for example, the power made available by the consumer may be integrated over the time period of the likely supporting case to give an energy. If this time period changes, the calculation of the available amount of supporting energy can be updated. Alternatively, this power made available by the consumer is directly added to the supporting power.

It is pointed out that, in this case of a consumer that is fixedly coupled to the wind power installation and is controllably reducible in its consumption, the basic electrical energy lies below the power generated from the wind by an amount equivalent to this power consumption.

According to one embodiment it is proposed that, for specifying the supporting power, a progression of the supporting power in dependence on the amount of supporting energy is specified. In particular, it is provided that the specifying of the supporting power depending on the amount of supporting energy takes place by way of a time-dependent progression. Such a progression of the supporting power in dependence on the amount of supporting energy may particularly take the form that, with a sufficient amount of supporting energy present at the beginning, as the supporting power a constant supporting power is specified on the basis of boundary conditions such as the capacity utilization of the inverter. If the available amount of supporting energy is then reduced below a specifiable minimum amount of supporting energy, the supporting power is then reduced as the available amount of supporting energy falls further. Preferably, a proportional relationship can be provided here between the available amount of supporting energy and the supporting power fed in or correspondingly specified. In this case, this would result in an ever more slowly falling supporting power, which ideally would asymptotically approach the value 0. According to another variant, it is proposed that, for the said remaining minimum amount of supporting energy, a remaining time interval is calculated, a time interval in which the power falls to 0 proportionally with time, and in this case exactly this remaining minimum amount of supporting energy is fed in, to give a further example.

If the time-dependent progression is used, it may also be provided that a progression of the supporting power over time that leads exactly to the consumption of the available amount of supporting energy is already predetermined for the entire available amount of supporting energy. Of course, the feeding in of the supporting power is always interrupted whenever supporting of the electrical supply grid is no longer necessary.

According to one embodiment, it is proposed that the at least one wind power installation is operated at an operating point that is initially improved when delivering rotational energy, in particular that the wind power installation is operated at such a high rotor speed that the rotor speed is temporarily reduced to an optimum rotor speed in terms of power by delivering centrifugal energy, that is to say rotational energy. This is proposed particularly for lower part-load operation, in which the wind speed is still well below the rated wind speed, for example is a maximum of 50% of the rated wind speed.

This is based on the realization that, although there is theoretically only one optimum operating point for the wind power installation, to be specific the optimum operating point in terms of power, near this optimum operating point there is an operating range that is only minimally less favorable than the operating point that is theoretically optimum in terms of power. Particularly, there is often an optimum rotor speed in terms of power, which is particularly also optimum with regard to taking the power from the wind. Both a higher rotor speed and a lower rotor speed are less favorable, but to a minor extent. Thus, it has particularly been realized that a rotor speed that is higher than the optimum rotor speed in terms of power only leads to a minimal worsening of the working point, but at the same time creates a significantly greater rotational energy, in particular a significantly greater available rotational energy. Often, it may even be the case that the resultant worsening of the working point is scarcely detectable by measuring instruments. Particularly in this case, it is proposed to operate the wind power installation at a correspondingly shifted operating point, to be specific at a correspondingly higher rotational speed.

Preferably, the available amount of supporting energy, that is to say here the available amount of rotational energy, that is to say the rotational energy that can still be reasonably taken, is taken as a measure for how much the rotor speed rises above the rotor speed calculated as optimum in terms of power. Here, an appraisal can be made between on the one hand the increasing available amount of supporting energy and on the other hand the efficiency of the operating point worsened by increasing the rotor speed. Particularly depending on whether a supporting case is to be expected in the electrical supply grid, or whether or how many other generators in the electrical supply grid can carry out sufficient support, a corresponding rotor speed can be set or changed by this appraisal.

According to one embodiment, it is proposed that the supporting power is specified in dependence on a grid state of the electrical supply grid, in particular in dependence on the power balance of the electrical supply grid, an upper power limit being additionally determined in dependence on the available amount of supporting energy and maintained, and the specified supporting power being reduced with a progression falling over time, in particular a flank falling over time, as soon as the available amount of supporting energy has reached a specified limit value.

The supporting power is therefore initially specified in dependence on a grid state of the electrical supply grid. This may be in particular the grid frequency, that is to say the frequency of the electrical voltage of the electrical supply grid, which may be an indicator of the power balance. It may possibly be conceivable to take the power balance of the electrical supply grid into consideration in some other way. This may for example take place by an externally transmitted item of information, which for example a grid operator could send.

To this extent, the electrical supply grid determines the supporting power, because the supporting power is intended to support the electrical supply grid. The wind power installation can however only make supporting power available to a limited extent, and it is consequently proposed to be economical with the supporting power. For this purpose, it is proposed to determine an upper power limit in dependence on the available amount of supporting energy and then of course also to maintain it. For this purpose, a supporting time period that experience suggests is to be expected can be taken as a basis. It is also conceivable to take a time period of 10 seconds as a basis. Preferably, this time period lies in the range from 5 to 30 seconds. Depending on the available amount of supporting energy determined, this gives a power value for the supporting power. In the simplest case, this means that this power value of the supporting power, that is to say the upper power limit, is chosen such that, with constant feeding in of a supporting power with this upper power limit, the available amount of supporting energy is used up at the end of the supporting time period assumed, or is used up apart from a remaining minimum amount of supporting energy. In order then to avoid abrupt ending of this supporting power, it is proposed to reduce the specified supporting power toward the end with a progression falling over time.

A wind power installation is also proposed, and it is prepared for feeding electrical energy into an electrical supply grid at a grid connection point. It comprises an aerodynamic rotor with rotor blades and the rotor has a moment of inertia and can be operated with variable rotor speed. Furthermore, it has a generator for generating a generator power and a control unit for controlling feeding in of a basic electrical power in dependence on wind power available. Such a control unit may be for example a process computer, which assumes some or all of the controls of the wind power installation. This control unit may for example control an inverter, and possibly further elements of the wind power installation.

Furthermore, the wind power installation comprises a specifying means for specifying a supporting power to be additionally fed in. Such a specifying means may be part of a control device such as a control processor of the wind power installation. Such a specifying means may however also be provided as a separate control means, or at least a separate control program. It specifies the supporting power to be additionally fed in, for example in dependence on the detected frequency and the electrical supply grid or on the basis of an external demand signal. The specified supporting power may be specified as an absolute value or else as a relative value. For example, the specification as a relative value is conceivable with respect to the rated power of the wind power installation or as a relative value is conceivable with respect to the power that is fed in at that moment in time.

Furthermore, the wind power installation has a feeding device for feeding in the specified supporting power for supporting the electrical supply grid. Such a feeding device may be for example an inverter, which for example obtains power from the generator as direct voltage or direct current and generates from it an alternating current to be fed in. The feeding device is in this case preferably provided at the same time for feeding in the power to be fed in altogether. To put it another way, a usual feeding device such as an inverter may be used, and can also at the same time assume the task of additionally feeding in the specified supporting power for supporting the electrical supply grid.

It is also provided that the wind power installation has a calculating unit for determining an available amount of supporting energy for the supporting power to be fed in. This calculating unit consequently determines an available amount of supporting energy, which can then be used as a source for the supporting power to be fed in. The supporting power is specified in dependence on the amount of supporting energy determined. The specifying means that specifies the supporting power to be additionally fed in consequently takes the available amount of supporting energy determined by the calculating unit into consideration and, depending on it, determines the supporting power. The specifying means for specifying the supporting power to be additionally fed in and the calculating unit for determining the amount of supporting energy may also be integrated in a unit, such as for example in a common microprocessor.

The wind power installation is preferably prepared for carrying out a method according to at least one of the described embodiments.

A wind farm comprising multiple wind power installations is also proposed, the wind power installations of this wind farm being designed according to at least one described embodiment of a wind power installation. Also or alternatively, the wind farm is prepared for implementing a method according to a described embodiment. This implementation can consequently be performed in such a way that each wind power installation of the wind farm itself carries out a corresponding method.

Also or alternatively, it may also be provided that the wind farm as a unit performs at least one method according to the described embodiment. In particular, a central farm computer or other central unit that assumes this task altogether for the farm may be provided for specifying the supporting power and/or for determining the available amount of supporting energy. The result may for example be distributed to the individual wind power installations for actual implementation. In this case, the specified supporting power and/or the available amount of supporting energy can be distributed among the individual wind power installations. Particularly when using a central energy store in the wind, the amount of supporting energy contained therein can be divided among the wind power installations and added to the available amounts of supporting energy of the rotational energy of the rotors of the wind power installations.

According to another embodiment, in the case where such a central energy store is provided in the farm, a feeding device which feeds into the electrical supply grid directly from the central energy store may be provided. In this case, it is also proposed that such supporting power fed in directly by the wind farm, without the use of a wind power installation, is coordinated by a farm controller, or in some other way. In this case, a coordination of this fed-in supporting power with the power fed in by the wind power installations or provided for feeding in is also performed. The calculation of the available amount of supporting energy takes both types of energy source into consideration, that is to say the rotational energies and the battery storage energy.

BRIEF DESCRIPTION OF THE SEVERAL VIEWS OF THE DRAWINGS

The invention is now explained in more detail below on the basis of exemplary embodiments with reference to the accompanying figures.

DETAILED DESCRIPTION

Figure 1:
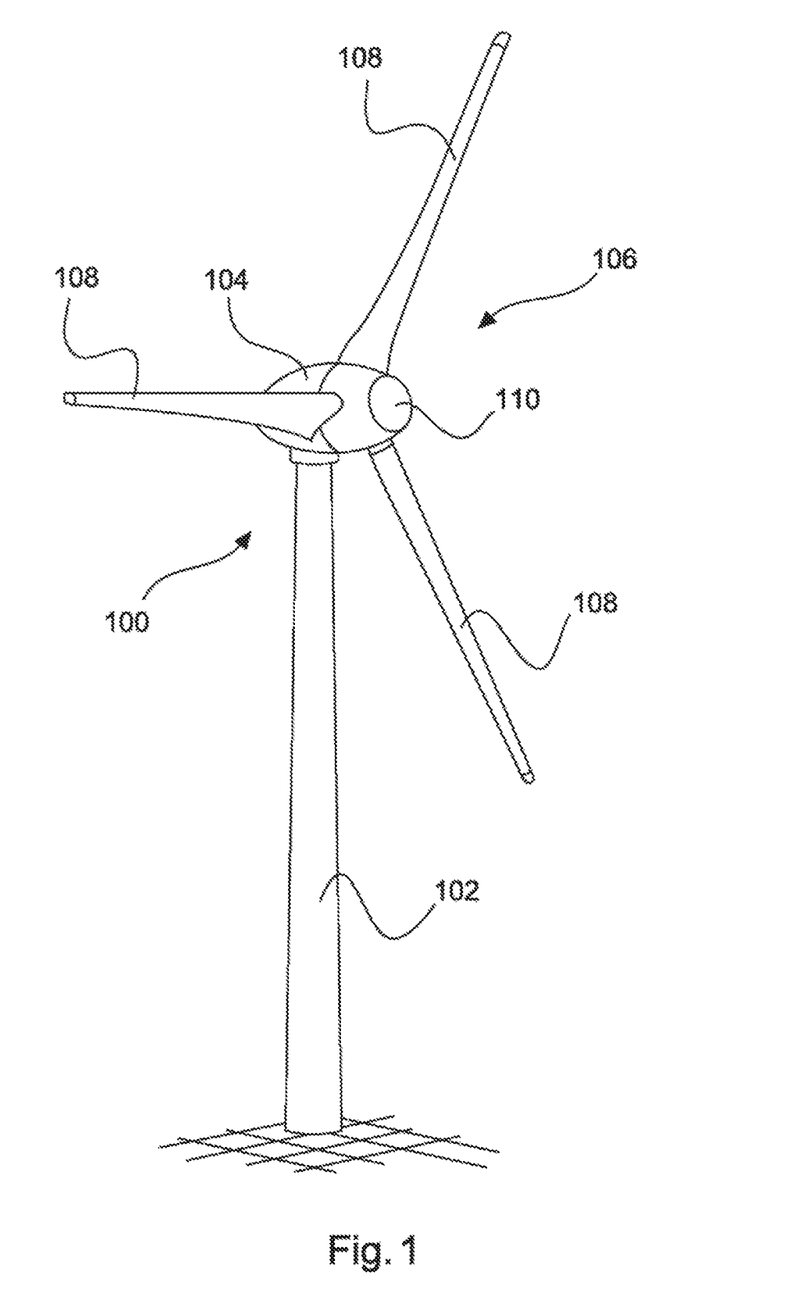
FIG. 1 shows a wind power installation in a perspective representation.

FIG. 1 shows a wind power installation 100 with a tower 102 and a nacelle 104. Arranged on the nacelle 104 is a rotor 106 with three rotor blades 108 and a spinner 110. During operation, the rotor 106 is set in a rotary motion by the wind, and thereby drives a generator in the nacelle 104.

Figure 2:
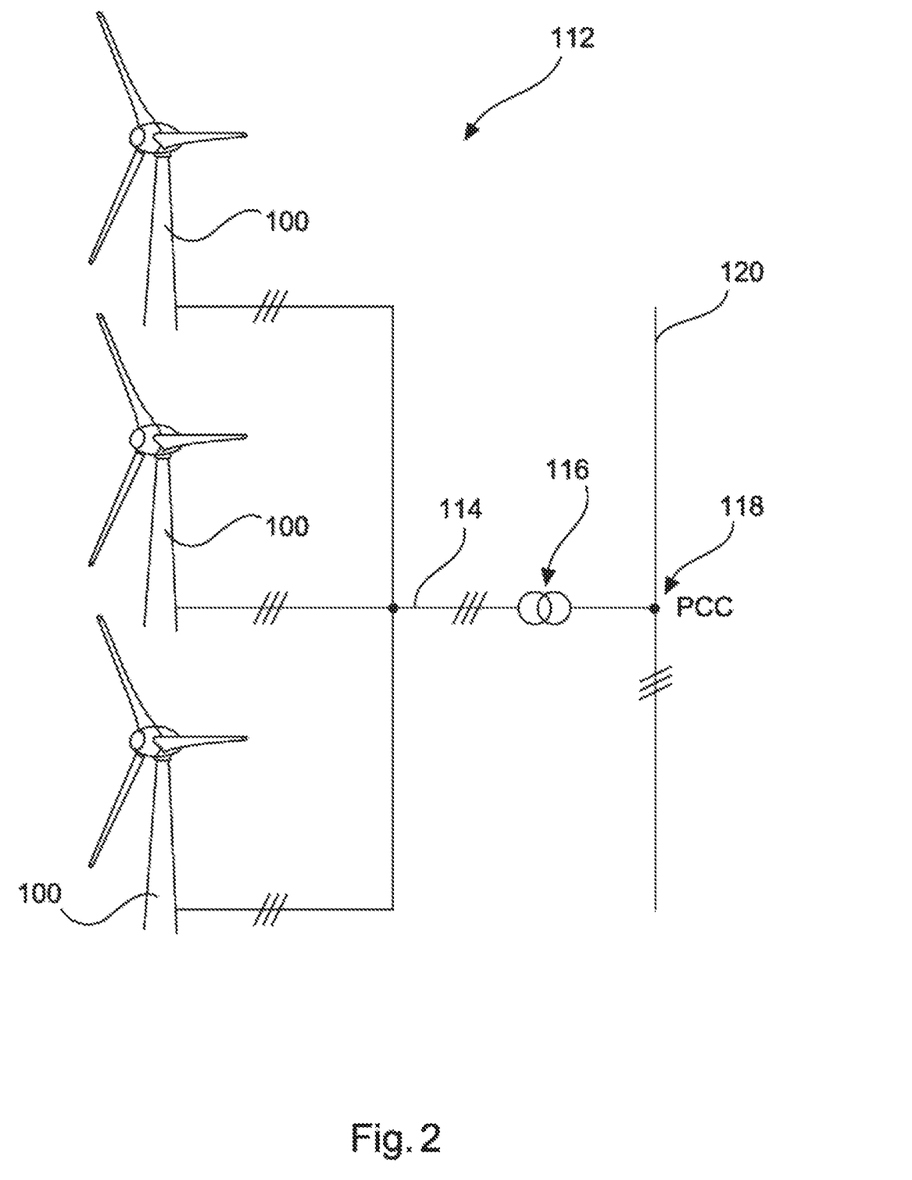
FIG. 2 shows a wind farm in a schematic representation.

FIG. 2 shows a wind farm 112 with, by way of example, three wind power installations 100, which may be the same or different. The three wind power installations 100 are consequently representative of essentially any number of wind power installations of a wind farm 112. The wind power installations 100 provide their power, to be specific in particular the electricity generated, by way of an electrical farm grid 114. In this case, the electricity or power respectively generated by the individual wind power installations 100 is added together and there is usually a transformer 116, which steps up the voltage in the farm in order then to feed into the supply grid 120 at the feed-in point 118, which is also referred to generally as the PCC. FIG. 2 is just a simplified representation of a wind farm 112, which for example does not show any controller, although there is of course a controller. It is also possible for example for the farm grid 114 to be differently designed, in that for example there is also a transformer at the output of each wind power installation 100, to name just one other exemplary embodiment.

Figure 3:
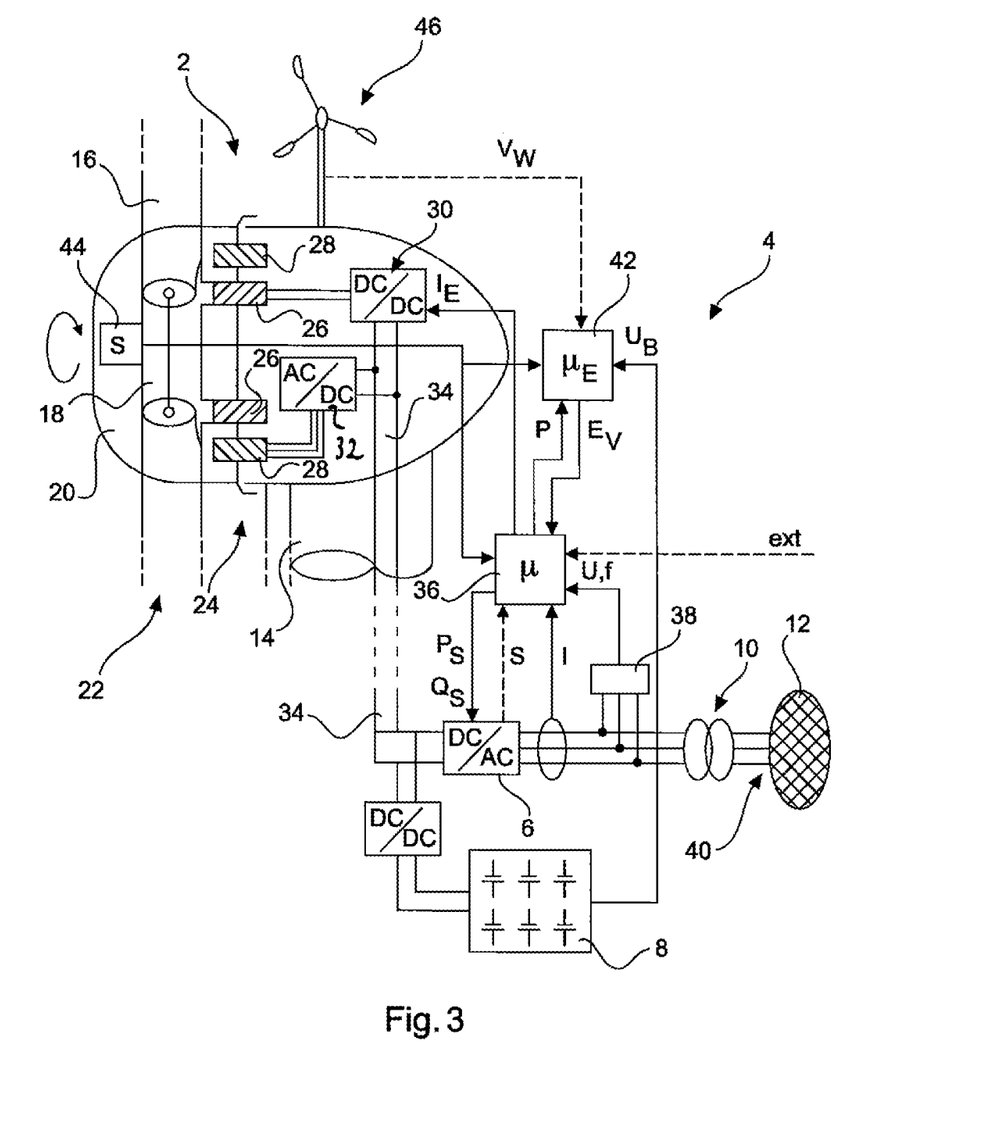
FIG. 3 schematically shows a control structure of a wind power installation.

FIG. 3 shows in a schematic and illustrative structure a nacelle 2 of a wind power installation with a control structure 4 including an inverter 6, which forms a feeding device. There is also a battery store 8 as a further energy source. With the feeding device 6, specifically the inverter, feeding takes place via a transformer 10 into a schematically indicated electrical grid 12. Further energy generators also feed into this electrical grid 12 and electrical consumers are connected to it, neither of which is shown here.

There follows first a general description of the operating principle of the wind power installation, of which the nacelle 2 and the end piece of the tower 14 are indicated. Arranged on the nacelle 2 are likewise schematically represented rotor blades 16, to be specific in the region of a hub 18 of a spinner 20. These rotor blades 16, of which there are preferably three, though only two are shown in FIG. 3, are driven by the wind and set the rotor 22, which consists substantially of the rotor blade 16, the hub 18 and the spinner 20, in a rotary motion. From this, electrical power is generated with the aid of the generator 24, to be specific generator power. The generator 24 has for this purpose a generator rotor 26 and a stator 28. The term generator rotor is used here irrespective of the type of generator 24, to avoid confusion with the aerodynamic rotor 22. The generator rotor 26 is in this case fixedly connected to the hub 18, and consequently to the rotor 22. In principle, however, a gear mechanism may also be interposed.

The preferred generator 24 is a synchronous generator. In particular, an externally excited synchronous generator is proposed. For providing exciter power for the externally excited synchronous generator, the current adjuster 30 is provided, feeding exciter current to the generator rotor 26. A slip ring used for this is not shown here.

The generator power generated by the generator 24 is passed by the stator 28 to the rectifier 32, which rectifies it and provides a correspondingly rectified direct current with a corresponding direct voltage at a bus bar 34. When operation is in progress, the current adjuster 30 can also draw its energy from the bus bar 34. For the following observations of the feeding in and grid support, the power component that the current adjuster 30 requires is ignored.

The bus bar 34, which does not necessarily have to be configured as a bar but may also be realized by lines or bundles of lines, is coupled to an input of the inverter 6.

The inverter 6 consequently converts the direct current or the direct voltage of the bus bar 34 into an alternating current or an alternating voltage, which is transformed via the transformer 10 and fed into the electrical grid 12.

If there is then a more or less sudden power demand, because for example the power balance in the electrical supply grid 12 has become negative, it may be envisaged to feed additional supporting power in through the inverter 6. In the embodiment shown in FIG. 3, it is particularly considered in this respect to use power from the battery store 8 or from the rotational energy of the rotor 22. For this purpose, the control unit 36 may specify a corresponding preset power $P_S$ for the inverter 6. Otherwise, it is suggested that the control unit 36 can also specify a reactive power $Q_S$ for the inverter 6. Furthermore, the inverter 6 may give the apparent power S to the control unit 36 as information.

This power $P_S$ to be fed in, which to this extent represents a preset power, is made up of a basic electrical power and the supporting power to be fed in. In a normal case, if there is no demand for supporting power, the preset power $P_S$ substantially corresponds to the basic power. It is consequently also used in normal operation to control the power delivery of the wind power installation. If a supporting power is then additionally to be fed in, because the value of this preset power $P_S$ is therefore to be additionally increased, the control unit 36 must first have a reason for this. Often, the reason will arise from the sensing of the grid frequency f. Particularly if the grid frequency f falls, such a demand for feeding in additional power for grid support may arise. Provided for this is the voltage measuring device 38, which apart from the output voltage U of the inverter 6 also senses the grid frequency f and feeds it to the control unit 36. Alternatively, the measurement of the voltage and frequency may also be performed elsewhere, such as for example between the transformer 10 and the electrical supply grid 12, that is to say at the grid connection point 40 there.

Also or alternatively, a demand for grid support may be detected or initiated by way of an external signal, which in FIG. 3 is indicated as "ext". The signal "ext" may be provided by a grid operator.

Consequently, the control unit 36 can detect the demand for feeding in additional supporting power for grid support on the basis of at least one of these variables mentioned.

It is thus proposed that, in addition to the calculation of the supporting power to be fed in, depending on these variables, which indicate such a demand, an amount of supporting energy that is present altogether is first sensed and then taken into consideration.

For the determination of the available supporting energy $E_V$, the calculating unit 42 is provided. The calculating unit 42, which can also be combined with the control unit 36 in one device or in a process controller, takes into consideration in the embodiment of FIG. 3 both available energy from rotational energy of the rotor 22 and storage energy of the battery store 8. The available amount of supporting energy $E_V$ thereby determined altogether is then taken into consideration for specifying the supporting power and for this, according to the structure of FIG. 3, is transmitted to the control unit 36.

The available amount of supporting energy $E_V$ is in this case additively made up of the individual available amounts of supporting energy of the rotor 22 and of the battery store 8. It is therefore made up of the available rotational energy of the rotor 22 and the available storage energy of the battery store 8.

The available storage energy of the battery store 8 may be determined for example depending on the battery voltage $U_B$. For this, the battery store may transmit this value of the battery voltage $U_B$ to the calculating unit 42. Alternatively, particularly whenever it is a complex bank of stores comprising many units, the battery store 8 could itself determine the available storage energy and transmit it to the calculating unit 42 or for example transmit a state of charge to the calculating unit 42, from which the calculating unit 42 then determines the available amount of storage energy.

For the determination or calculation of the available rotational energy of the rotor 22, the calculating unit 42 obtains inter alia the rotational speed n, which can be sensed by the speed sensor 44. The mass moment of inertia of the rotor 22 is available to the calculating unit 42, and consequently the rotational energy can be calculated in dependence on the rotational speed n.

The rotational energy stored by the rotor 22 on the basis of its rotational speed n at the time is however not in fact available completely, because, in particular at a moment in which the grid is to be supported, the rotor should not or must not be reduced to 0, or another rotational speed that is too low.

Correspondingly, the calculating unit 42 also takes into overall consideration the operating point of the wind power installation, which can also be referred to as the working point. In this respect, it is particularly conceivable also to take into consideration the power P at the time, to be specific the installation power at the time, that is to say the power that the wind power installation is delivering at the particular time. The calculating unit 42 obtains this currently applicable power P from the control unit 36. The control unit 36 usually knows this currently applicable power P because it uses this power P for controlling the wind power installation itself. In particular, the control unit 36 sets the working point of the wind power installation.

As a precaution, it is pointed out that such control of the wind power installation may also be carried out in a further control unit or that a common central control unit that combines performing the tasks of the control unit 36 and the calculating unit 42 may also be provided.

On the basis of this operating point, which is consequently known to the calculating unit 42, at least with regard to the rotational speed n and the power P, it can thus be estimated down to which speed the rotor 22 could be braked. This can then not only be used for determining the rotational energy that is present, but also the rotational energy that is available, which is part of the rotational energy that is present altogether.

Moreover, the calculating unit 42 may give the control unit 36 a proposal or setpoint value for a speed increase, to which the speed can be increased in order in this way to create greater rotational energy, to then achieve a greater available rotational energy after all. However, this is not shown any further in FIG. 3.

In addition, the blade angle of the rotor blades may also be taken into consideration for the evaluation of the operating point. This blade angle α may for example be measured at the rotor blades 16, which is indicated in FIG. 3. Alternatively, the control unit 36 may specify such a blade angle and at the same time transmit it to the calculating unit 42. If for example in part-load operation, when the installation is therefore not running at rated power, the blade angle is greater than a part-load angle typical for this operating mode, this indicates that a stronger wind is blowing than would be assumed just on the basis of the rotational speed and the power. This may mean for example that the operating point at the time is at a flank of a speed/power characteristic curve, and therefore the rotational speed cannot be reduced greatly, because that could lead to a great power loss. This is taken into consideration in the determination of the supporting energy present. If this available amount of supporting energy EV has been determined, the control unit 36 can consequently determine the supporting power to be additionally fed in, and can correspondingly increase the preset power PS and give a corresponding setpoint value to the inverter 6.

In addition, the control unit 36 can for this purpose increase the exciter current $I_E$ and for this purpose pass a corresponding signal to the current adjuster 30.

It is also conceivable in principle to use instead of a passive rectifier 32 a controlled rectifier and in addition to change the stator currents, and thereby change the generator power. By changing the generator power, particularly by increasing the exciter current $I_E$, the rotor 22 is braked and the rotational energy is thereby taken.

It is thus possible to already preplan the supporting power feeding in for grid support in light of the available amount of supporting energy, and thereby achieve a support of the electrical supply grid and at the same time ensure that the wind power installation has a stable operating point at every point in time. It is particularly prevented in this way that the wind power installation suddenly collapses in its power delivery while it is feeding additional supporting power into the electrical supply grid.

Figure 4:
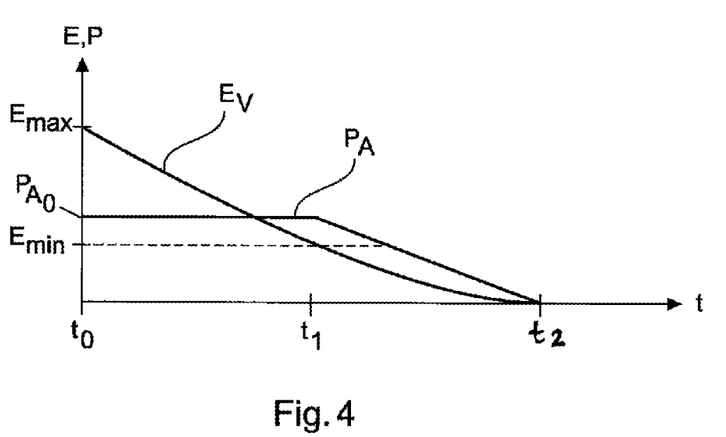
FIG. 4 shows a power- and energy-time diagram.

One possible way of planning supporting power $P_A$ in dependence on the available supporting energy $E_V$ is illustrated in FIG. 4. There, the available amount of supporting energy or the available supporting energy $E_V$ is plotted in dependence on the time t and the supporting power $P_A$ is likewise plotted in the same diagram. The embodiment illustrated there provides that the supporting power $P_A$ is first specified in dependence on a sensed underfrequency in the electrical supply grid, and for the amount of supporting energy $E_V$ it is checked whether this lies above or below a specified limit value, to be specific whether it lies below the minimum amount of supporting energy $E_{min}$. For this, it is assumed as a simplification that the criterion that initiates the supporting power $P_A$ in principle, for example a frequency that is too low, would lead to a constant supporting power $P_A$. A constant value is correspondingly initially assumed for the supporting power $P_A$ to be fed in. That could however also vary, for example depending on the deviation of the grid frequency from a grid frequency setpoint value, or be determined in dependence on a frequency gradient of the grid frequency.

Consequently, this supporting power $P_A$ initially has the value $P_{A0}$ and retains this value from the point in time $t_0$ to the point in time $t_1$. The available amount of supporting energy $E_V$ begins at the point in time $t_0$ with the maximum value for the amount of supporting energy $E_{max}$ and falls linearly as a result of the constantly fed-in supporting power $P_A$ up to the point in time $t_1$.

At the point in time $t_1$, it reaches and goes below the value of the minimum amount of supporting energy $E_{min}$ and that leads to the supporting power $P_A$ being reduced.

The embodiment shown there proposes in this case that, from the point in time $t_1$, the supporting power $P_A$ is reduced linearly to 0, to be precise such that exactly the amount of supporting energy still available at the point in time $t_1$ is used up. For the special case where a power is reduced linearly from an initial value, here specifically the constant supporting power value $P_{A0}$, to 0, the energy E required thereby can be calculated with the formula $E=\frac{1}{2}P^*t$. Since the energy to be consumed corresponds here to the energy still present at the point in time $t_1$, to be specific the minimum amount of supporting energy $E_{min}$, and the initial power corresponds to the power $P_{A0}$, the time in which power is reduced linearly to 0 is calculated with the formula $t=2^*E/P_{A0}$. The time thus calculated is the time period according to the diagram of FIG. 4 from the point in time $t_1$ to the point in time $t_2$. This progression is illustrated in FIG. 4 and, with this variant, at first a great supporting power $P_A$ can be fed in, and only later is reduced, and even with the reduced values can initially still provide a supporting contribution. At the same time, the available amount of supporting energy $E_V$ is optimally utilized.

Figure 5:
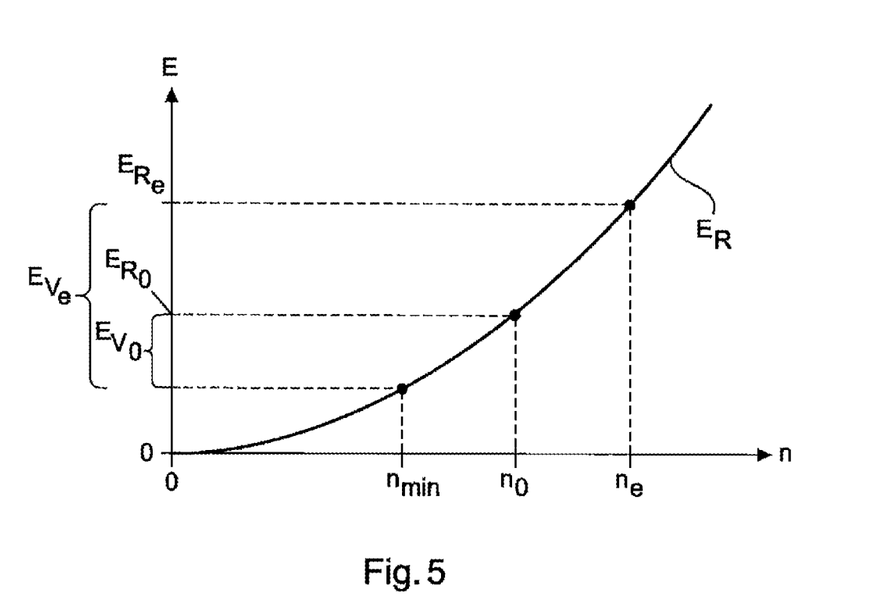
FIG. 5 schematically shows in a diagram the progression of a rotational energy in dependence on a rotational speed.

FIG. 5 illustrates relationships between the rotational speed n and the available rotational energy. The diagram shows on the x axis the rotational speed n from the value 0 to beyond an extended rotational speed $n_e$. In addition, the rotational energy $E_R$ is plotted in dependence on the rotational speed n. It is evident that the rotational energy $E_R$ at the rotational speed with the value 0 is likewise 0 and, from there, increases quadratically with the speed n.

In the case of the diagram of FIG. 5, it is assumed that the wind power installation is operated at the rotational speed $n_0$. That represents the normal rotational speed for it, which would usually be used, in particular with the prevailing wind speed in this case. This rotational speed $n_0$ is consequently assigned a rotational energy $E_{R0}$. This rotational energy $E_{R0}$ is however not the available amount of rotational energy, because the rotational speed may only be reduced down to the minimum speed $n_{min}$. Correspondingly, here the available amount of rotational energy is only the normally available amount of rotational energy, indicated by $E_{V0}$. Precisely this normally available amount of rotational energy $E_{V0}$ is calculated here as the available amount of supporting energy, assuming that no further energy sources are present.

FIG. 5 also illustrates that an increase of the available amount of rotational energy is possible if the wind power installation is operated at a higher rotational speed. For illustrative purposes, the increased or extended rotational speed $n_e$ is proposed for this. This leads to an energy value $E_{Re}$ as the extended rotational energy of the rotor. As a result of this increase in the rotational speed to this extended speed $n_e$, the available amount of rotational energy can consequently be increased to the value of the extended available amount of rotational energy $E_{Ve}$. On account of the quadratic relationship between the rotational energy $E_R$ and the rotational speed n, this proposed increase in speed has a very great effect. As a precaution, it is pointed out that FIG. 5 is illustrative and, depending on the operating point, smaller speed increases are also conceivable, and to this extent FIG. 5 is only illustrative.

The invention claimed is:

1. A method for feeding electrical power into an electrical supply grid by at least one wind power installation at a grid connection point, wherein:
   the at least one wind power installation has an aerodynamic rotor with rotor blades and the rotor has a moment of inertia and is configured to be operated with a variable rotor speed,
   the at least one wind power installation has a generator for generating a generator power,
   a plurality of energy generators feed power into the electrical supply grid, and
   a plurality of consumers take power from the electrical supply grid so that a power balance in the electrical supply grid between the power fed in and the power taken is produced and is positive when more power is fed in than is taken, wherein the method comprises:
   feeding in a basic electrical power in dependence on available wind power;
   determining an amount of supporting energy available for a supporting power to be fed;
   specifying the supporting power to be additionally fed in, wherein the specifying the supporting power depends on the amount of supporting energy available and on a grid state of the electrical supply grid; and
   feeding in the specified supporting power for supporting the electrical supply grid,
   wherein an upper power limit of the supporting power is determined in dependence on the amount of supporting energy and maintained; and
   wherein the specified supporting power is reduced with a progression falling over time in response to the available amount of supporting energy reaching a specified limit value.

2. The method as claimed in claim 1, wherein the amount of supporting energy available comprises at least one of:
   the moment of inertia of the rotor;
   at least one operating parameter of an operating point of the at least one wind power installation; or
   an admissible lower rotor speed.

3. The method as claimed in claim 2, wherein the at least one operating parameter of the operating point at a particular time comprises at least one of:
   rotor speed at the particular time;
   generator power at the particular time; or
   prevailing wind speed.

4. The method as claimed in claim 1, wherein at least one inverter is used for feeding in the electrical power, and wherein the supporting power to be additionally fed in is determined depending on a capacity utilization of the at least one inverter and depending on a reactive power fed in.

5. The method as claimed in claim 1, wherein for determining the available amount of supporting energy, a power loss due to a reduction of the rotor speed is taken into consideration.

6. The method as claimed in claim 1, wherein the at least one wind power installation is coupled to at least one electrical energy store, and wherein a rotational energy of the rotor and in each case a storage content of the at least one electrical energy store are used to determine the available amount of supporting energy, the at least one electrical energy store comprising at least one of: a battery or a high-capacity capacitor.

7. The method as claimed in claim 1, wherein when feeding in the specified supporting power, wherein the available amount of supporting energy is updated:
   in dependence on the supporting power fed in; and
   while taking into consideration a behavior of change of the at least one wind power installation as a reaction to the feeding in of the supporting power.

8. The method as claimed in claim 1, wherein the at least one wind power installation is coupled to at least one consumer that can be controllably reduced in its consumption and the determination of the available amount of supporting energy takes into consideration an amount of energy that is available due to a reduction of the at least one controllably reducible consumer.

9. The method as claimed in claim 1, wherein specifying the supporting power comprises specifying a progression of the supporting power in dependence on the amount of supporting energy.

10. The method as claimed in claim 1, wherein the at least one wind power installation is operated at an operating point that is initially improved when delivering rotational energy.

11. A wind power installation for feeding electrical power into an electrical supply grid at a grid connection point, the wind power installation comprising:
   an aerodynamic rotor with rotor blades, wherein the rotor has a moment of inertia and is configured to be operated with variable rotor speed;
   a generator for generating a generator power;
   a control unit for controlling feeding in of electrical power in dependence on wind power available;
   a specifying means for specifying a supporting power to be additionally fed in;
   a feeding device for feeding in the specified supporting power for supporting the electrical supply grid; and
   a calculating unit for determining an available amount of supporting energy for the supporting power to be fed in, wherein the supporting power is specified in dependence on the amount of supporting energy determined,
   wherein the supporting power is specified in dependence on the amount of supporting energy available and a grid state of the electrical supply grid;
   wherein an upper power limit of the supporting power is determined in dependence on the available amount of supporting energy and maintained; and
   wherein the specified supporting power is reduced with a progression falling over time in response to the available amount of supporting energy reaching a specified limit value.

12. A wind power installation configured to carry out the method as claimed in claim 1.

13. A wind farm comprising:
   a plurality of wind power installations comprising the wind power installation as claimed in claim 11.

14. The method as claimed in claim 2, wherein the admissible lower rotor speed is determined depending on a rotational speed at a particular moment in time.

15. The method as claimed in claim 9, wherein specifying the supporting power depending on the amount of supporting energy takes place by way of a time-dependent progression.

16. The method as claimed in claim 10, wherein the at least one wind power installation is operated at such a high rotor speed that the rotor speed is temporarily reduced to an optimum rotor speed in terms of power by delivering centrifugal energy.

17. The method as claimed in claim 1, the supporting power is specified in dependence on the power balance of the electrical supply grid.

18. The method as claimed in claim 1, wherein the specified supporting power is reduced with a flank falling over time.

19. The method as claimed in claim 1, wherein the specified limit value is a minimum amount of supporting energy.

20. The method as claimed in claim 7, wherein while taking into consideration the behavior of change of the at least one wind power installation as the reaction to the feeding in of the supporting power, particularly while taking into consideration a decrease in the rotor speed as a reaction to delivering rotational energy of the rotor.

* * * * *